June 6, 1950 W. F. HURLBURT 2,510,891
ELECTRICAL CIRCUIT FOR ENGINE-DRIVEN GENERATORS
Filed Oct. 4, 1947
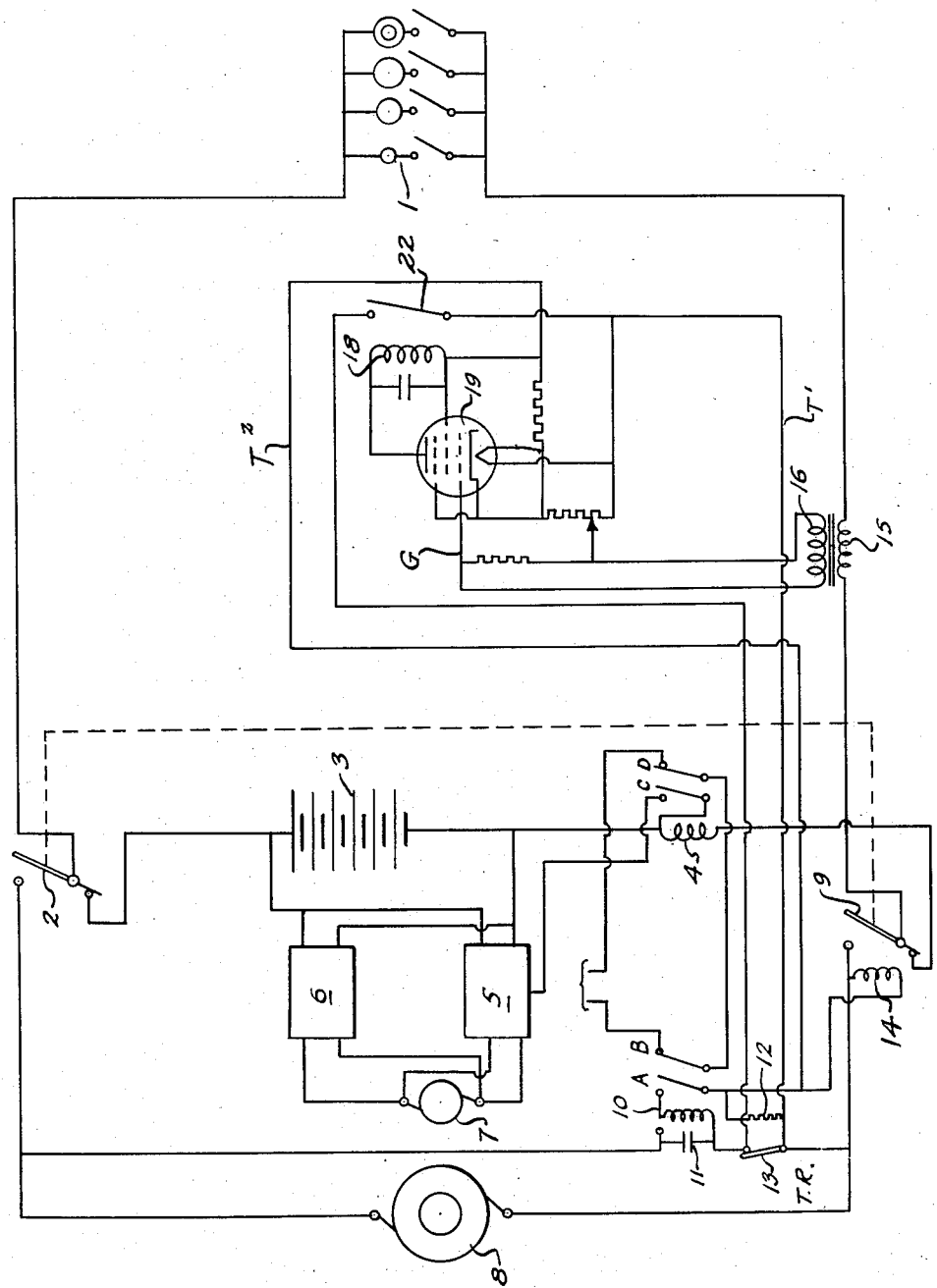
INVENTOR
WILBUR F. HURLBURT
BY
Border Bowman
ATTORNEY Patented June 6, 1950

2,510,891

UNITED STATES PATENT OFFICE 2,510,891

ELECTRICAL CIRCUIT FOR ENGINE-DRIVEN GENERATORS

Wilbur F. Hurlburt, South Orange, N. J., assignor to Automatic Switch Company, Orange, N. J.

Application October 4, 1947, Serial No. 778,017

5 Claims. (Cl. 290—30)

My invention relates to generator circuits, particularly those for engine driven A. C. generators having automatic starting and stopping mechanism.

A particular object is to arrange the circuits so that the engine will be automatically started by a load amounting to a few watts such as 25 watts or up to maximum plant capacity and to employ standard forms of relays and contactors not requiring particularly delicate constructions, resulting in lower initial cost, longer life due to the more sturdy parts used with less danger of failure of operation.

A main feature is in the arrangement of the circuits for the battery, starting and stopping mechanism, requiring only a limited number of battery cells, and the main line A. C. current such that after the engine operated generator has developed current of the desired potential and frequency, the main line circuit will be automatically closed and simultaneously the circuit of the starting mechanism will be opened and the stopping circuit likewise controlled—all brought about by the application of a load and upon the disconnection of all load the mechanism will close down leaving all parts in position for restarting upon reapplication of a load such as described.

In a general way the circuits include one for the storage battery for starting, one for the stopping, a main line circuit for the A. C. current, a shunt circuit for the alternating current and a circuit for the secondary of a transformer and an electronic valve and an auxiliary circuit controlled by the electronic valve. When the engine driven generator has reached normal operating condition generating current of the desired potential and frequency, the main line will be closed disconnecting the starting circuit and simultaneously closing one of the terminals of the stopping circuit which have been opened upon the starting of the engine, the other terminal having been opened by the current through the shunt circuit. After engine operation is successful and potential and frequency have reached normal operating condition, the main line circuit is closed to the primary of the transformer connected in series with the load, thereby causing the electronic valve to function.

The electronic valve is responsive to the potential and frequency of the main line current causing the electronic valve to close an auxiliary circuit whereby the main circuit will be maintained closed and the stopping circuit to remain open at said last mentioned terminal, as long as a predetermined load is applied, a thermal relay being in the shunt circuit and being in combination with the electronic valve in such a way that the thermal relay in its normal cool condition maintains its circuit initially closed thereby closing the main line. Before the thermal relay is heated sufficiently to open its operating circuit, the main line current will have assumed control maintaining the main line circuit closed as well as the stopping circuit open until all load is disconnected, which will result in closing the stopping circuit and leaving all circuits in condition for restarting upon re-application of the load, the shunt circuit being closed so soon as the thermal relay becomes cool, all of which will be more fully explained hereafter.

In the accompanying drawing which discloses a preferred embodiment of the invention, there is shown at 1 a series of light bulbs which represent merely, as an illustration, a load and by connecting one light bulb 25 watts can be applied to the wiring system which is constructed to cause a starting of the engine driven generator upon that connection of 25 watts or a load up to maximum plant capacity. In the case of applications of other types of loads there should be provision for connecting a load of 25 watts or more. There are shown double pole switches marked 2 and 9 connecting the line from the light bulbs to the battery 3. A standard pilot relay is indicated by 4. A cranking and safety control is indicated at 5 and a charging control at 6, and exciter at 7, and a generator at 8. The connection of 25 watts or more on the wiring system will energize the coil of relay 4 from the battery through normally closed contacts of switches 2 and 9 and when the coil of relay 4 is energized contact C closes and initiates cranking operation and puts safety control in action. It is to be noted that the stopping circuit is opened by the opening of contact D when a load is applied to the battery circuit and, as will be more fully explained, one of the contacts D or B will be open as long as the load is applied, contact D being closed when the relay 4 is de-energized and B being closed when relay 10 is de-energized by the removal of the load.

After cranking operation is successful and engine fires and begins to generate current, relay 10, which is sensitive to frequency and potential by virtue of the condenser 11 shown in the line, acts, when potential and frequency have reached normal operating condition, to close contact A, the thermal relay switch 13 being in a shunt circuit with the main line alternating current and the switch 13 being normally closed permits the coil of relay 10 to be energized. When contact A is closed, the exciting coil 14 causes switches 2 and 9 to close the main line circuit and deenergize pilot relay 4, thereby opening contact C and closing contact D. At the time contact A closes, contact B of same relay 10 opens the stopping circuit.

As heretofore explained, thermal relay switch 13 is in a shunt circuit and the thermal relay and switch placed in operating circuit of relay 10 in such a manner as to close operating circuit of relay 10 when the thermal heating element is cool but it is intended that this element shall be arranged so that it will heat and open the switch 13 after the switch of relay 18 has closed, as hereafter explained.

After the generator or alternator is in operation and developing line current, the tube or electronic valve 19 becomes energized through lines $T^1$ and $T^2$ causing the tube to become sensitive to the potential applied to grid connection G, from the secondary 16 of the transformer, the said potential being developed by main line current flowing through the primary 15. Therefore, soon after the switch of relay coil 14 is closed, the tube circuit will be functioning in such a manner that current flowing in the line through said primary coil will cause contacts of relay 18 to close thus maintaining closed the coil circuit of relay 10 and keeping same energized after thermal relay 12 opens.

The characteristics of the tube circuit are such that contacts of relay 18 will close and remain closed with any load from 25 watts to maximum capacity of the generator. The circuit is further arranged so that after all load is disconnected, the contacts of relay 18 open. This deenergizes the circuit of relay 10 thus opening contact A thereby deenergizing the main line coil 14 and closing the stopping circuit through contact B, contact D having been closed at the time relay 4 was deenergized upon the closing of main line relay 18. It will thus appear that the circuits are arranged so that application of 25 watts or more will cause automatic starting of this plant and disconnection of all load will cause the plant to close down automatically, leaving all parts in position for restarting upon reapplication of the load.

Without further analysis the foregoing will so fully reveal the gist of this invention that others can by applying current knowledge readily adapt it for various utilizations and such adaptations should be, and are intended to be comprehended within the meaning and range of equivalents in the following claims:

Having thus revealed this invention, I claim as follows:

1. The combination with a source of alternating current including a generator and engine, a main line circuit for said generator, a starting a battery and stopping circuit for said engine, a pilot relay controlled by a predetermined load, whereby said relay will be energized and said starting circuit closed whenever said load is applied to close said battery circuit, a thermal and standard relay normally in a shunt circuit with said generator, a second relay for initially closing said main line energized when said standard relay is energized, a transformer in said main line whose primary is closed to the main line when said generator develops the desired operating potential and frequency, the secondary including an electronic valve sensitive to the potential developed by the main line current flowing through said primary, a standard relay in circuit with said valve and its contacts controlled by said valve for shunting the contacts of the thermal relay, an auxiliary alternating current circuit closed by said relay for maintaining said main line closed after the initial closing thereof, said thermal relay being effective at a predetermined time following the closing of said auxiliary circuit for causing the opening of the shunt circuit, two contacts for said stopping circuit one of which is controlled by said pilot relay and the other is controlled by the standard relay in the shunt circuit.

2. An electric power system comprising a generator and engine, starting, battery and stopping circuits, a main line circuit for said generator and a shunt circuit for same in combination with a pilot relay controlled by a predetermined load whereby said relay will be energized and said starting circuit closed whenever said load is applied to close said battery circuit, a thermal and a second relay positioned in said shunt circuit and energized by same, a third relay and its contacts for closing said main line initially controlled by said second relay, a transformer in said main line whose primary is closed when said line is closed, its secondary including an electronic valve sensitive to the potential developed by the main line current, a relay in circuit with said valve and controlled by same, an auxiliary circuit and its contacts closed by said last mentioned relay for maintaining said main line closed and capable of causing the contacts of the thermal relay to be shunted at a predetermined time following the closing of said auxiliary circuit and under its influence for causing said shunting of thermal contacts to open said shunt circuit, said thermal relay being also effective for closing said shunt circuit after said main line is opened by the removal of the load whereby said shunt circuit will be capable of initiating a closing of said main line.

3. An electric system, comprising a generator and engine, a starting, battery and stopping circuit, a main line circuit for said generator and a shunt circuit for same in combination with a pilot relay controlled by a predetermined load whereby said starting circuit will be closed when said load is applied to said battery circuit, a thermal and second relay in said shunt circuit energized by same, a third relay and its contacts for closing said main line initially controlled by said second relay, a transformer whose primary is closed when said line is closed, its secondary including an electronic valve sensitive to the potential developed by the main line current, a relay in circuit with said valve, an auxiliary alternating circuit, its contacts being closed by said last mentioned relay for maintaining the second relay energized after the shunt circuit is opened by the shunting of the thermal relay contacts, the said thermal relay being effective at a predetermined time following the closing of said auxiliary circuit for shunting its contacts for putting the control of said second relay under the control of the auxiliary alternating current circuit.

4. An apparatus for controlling an alternating circuit comprising an engine driven generator, starting and stopping circuits for said engine in combination with a storage battery circuit, a main line alternating circuit and a shunt circuit for said generator, a pilot relay energized when said battery circuit is closed by a load of 25 watts or more, contacts for the starting circuit closed by said relay and contacts for the stopping circuit one of which is opened by the relay at time of closing said starting circuit and held open until said relay is deenergized, a thermal relay and a second relay in said shunt circuit energized by the same for opening the other of said stopping circuit contacts, a third relay and its contacts for initially closing said main line circuit and causing the deenergization of said pilot relay thereby opening the battery circuit and causing the first mentioned contact of said stopping circuit to close, said second mentioned relay having contacts closed by it for causing the third relay to be energized, a transformer in said main line whose primary is closed to the main line when said generator develops the desired operating potential and frequency, the secondary including an electronic valve sensitive to the potential developed by the main line current flowing through said primary, a standard relay with its contacts in circuit with said valve, an auxiliary alternating current circuit closed by said relay for shunting the contacts of the thermal relay after the initial closing of the main line, said thermal relay being effective at a predetermined time following the closing of said auxiliary circuit for causing the opening of the shunt circuit and putting the control of said second relay under the control of the auxiliary alternating current circuit.

5. An apparatus for controlling an alternating circuit comprising an engine driven generator, starting and stopping circuits for said engine in combination with a storage battery circuit, a main line alternating circuit and a shunt circuit for said generator, a pilot relay energized when said battery circuit is closed by a load of 25 watts or more, contacts for the starting circuit closed by said relay and contacts for the stopping circuit one of which is opened by the relay at time of closing said starting circuit and help open until said relay is deenergized, a delayed action means and a second relay in said shunt circuit energized by the same for opening the other of said stopping circuit contacts, a third relay and its contacts for initially closing said main line circuit and causing the deenergization of said pilot relay thereby opening the battery circuit and causing the first mentioned contact of said stopping circuit to close, said second mentioned relay having contacts closed by it for causing the third relay to be energized, a transformer in said main line whose primary is closed to the main line when said generator develops the desired operating potential and frequency, the secondary including an electronic valve sensitive to the potential developed by the main line current flowing through said primary, a standard relay with its contacts in circuit with said valve, an auxiliary alternating current circuit closed by said relay for shunting the contacts of the delayed action means after the initial closing of the main line said delayed action means being effective at a predetermined time following the closing of said auxiliary circuit for causing the opening of the shunt circuit and putting the control of said second relay under the control of the auxiliary alternating current circuit.

WILBUR F. HURLBURT.

REFERENCES CITED

The following references are of record in the file of this patent:

UNITED STATES PATENTS

| Number | Name | Date |
| --- | --- | --- |
| 1,515,166 | Pardee | Nov. 11, 1924 |
| 1,515,354 | Miller | Nov. 11, 1924 |
| 1,704,996 | Witzel | Mar. 12, 1929 |
| 1,842,509 | Dickey | Jan. 26, 1932 |
| 2,071,826 | Frank | Feb. 23, 1937 |
| 2,384,135 | Scherry | Sept. 4, 1945 |
| 2,427,462 | Kaelin | Sept. 16, 1947 |